US012779929B2

(12) United States Patent
Khajepour et al.

(10) Patent No.: US 12,779,929 B2
(45) Date of Patent: Nov. 3, 2026

(54) AIR SPRING WITH ADJUSTABLE STIFFNESS AND VEHICLE AIR SUSPENSION SYSTEM

(71) Applicant: Shandong Meichen Industry Group Co., Ltd., Weifang (CN)

(72) Inventors: Amir Khajepour, Waterloo (CA); Yukun Lu, Waterloo (CA); Ruilong Li, Weifang Shandong (CN); Ran Zhen, Weifang Shandong (CN); Yegang Liu, Weifang Shandong (CN); Guoqiang Li, Weifang Shandong (CN)

(73) Assignee: Shandong Meichen Industry Group Co., Ltd., Shandong (CN)

( * ) Notice: Subject to any disclaimer, the term of this patent is extended or adjusted under 35 U.S.C. 154(b) by 606 days.

(21) Appl. No.: 18/214,580

(22) Filed: Jun. 27, 2023

(65) Prior Publication Data

US 2024/0166012 A1 May 23, 2024

Related U.S. Application Data

(63) Continuation of application No. PCT/CN2022/131352, filed on Nov. 11, 2022.

(51) Int. Cl.
*F16F 9/04* (2006.01)
*B60G 17/048* (2006.01)
*F16F 9/32* (2006.01)

(52) U.S. Cl.
CPC ........ *B60G 17/0485* (2013.01); *F16F 9/0409* (2013.01); *F16F 9/3235* (2013.01)

(58) Field of Classification Search
CPC .. F16F 9/0409; F16F 9/04; F16F 9/049; F16F 9/05; F16F 9/052; F16F 9/055
See application file for complete search history.

(56) References Cited

U.S. PATENT DOCUMENTS 5,413,316 A * 5/1995 Easter ................ B60G 17/0521 267/64.27
2005/0098931 A1* 5/2005 Schisler ............... B60G 17/005 267/64.27

FOREIGN PATENT DOCUMENTS

CN 101412354 A 4/2009
CN 203627631 U 6/2014
(Continued)

OTHER PUBLICATIONS

Machine translation of CN 114033826 (no date).*
International Search Report of Corresponding Application No. PCT/CN2022/131352; Jul. 9, 2023; 4 Pgs.

*Primary Examiner* — Nicholas J Lane
(74) *Attorney, Agent, or Firm* — Cooper Legal Group, LLC

(57) ABSTRACT

An air spring with adjustable stiffness and a vehicle air suspension system are disclosed, belonging to the technical field of vehicle shock absorption device. The air spring comprises a main body consisting of an upper sealing plate, a lower sealing plate and a main air spring bellow, wherein an air spring bellow for adjustment is arranged in the main body, the air spring bellow for adjustment divides an inner space of the main body into different regions, with a region out of the air spring bellow for adjustment being a first region and a region inside the air spring bellow for adjustment being a second region. The first region and the second region are respectively connected to a high-pressure gas source, and a gas pressure in the first region and in the second region can be individually controlled.

7 Claims, 12 Drawing Sheets

(56) References Cited

FOREIGN PATENT DOCUMENTS

| | | | | | |
|---|---|---|---|---|---|
| CN | 104011426 | A | | 8/2014 | |
| CN | 105673759 | A | | 6/2016 | |
| CN | 110552991 | A | | 12/2019 | |
| CN | 114033826 | A | * | 2/2022 | .............. F16F 9/049 |
| DE | 693338 | C | | 7/1940 | |
| DE | 2014593 | A1 | | 10/1970 | |
| DE | 1780264 | A1 | | 3/1972 | |
| DE | 102006016141 | A1 | | 10/2007 | |
| DE | 102021121511 | A1 | | 3/2022 | |
| JP | H0828618 | A | | 2/1996 | |
| JP | H11101287 | A | | 4/1999 | |
| JP | 2009154547 | A | | 7/2009 | |

* cited by examiner

AIR SPRING WITH ADJUSTABLE STIFFNESS AND VEHICLE AIR SUSPENSION SYSTEM

CROSS-REFERENCE TO RELATED APPLICATION

This application is a continuation of PCT application serial no. PCT/CN2022/131352, filed on Nov. 11, 2022. The entirety of PCT application serial no. PCT/CN2022/131352 is hereby incorporated by reference herein and made a part of this specification.

TECHNICAL FIELD

The present application relates to the technical field of vehicle shock absorption device and, in particular, to an air spring with adjustable stiffness and a vehicle air suspension system.

BACKGROUND ART

Air springs were originally designed for heavy aircraft. Nowadays, air springs are also widely used in automobile industry, so as to realize an autonomous adjusting function of the height of the suspension and a smooth driving quality.

In general, requirements for the suspension are different by different road driving conditions and speeds. The suspension is required to have a higher stability by high-speed driving. The suspension is required to have an excellent lane keeping capacity by off-road driving. Therefore, a suspension with relatively high stiffness is preferred by high-speed driving on a paved road, while a suspension with relatively low stiffness is preferred by low-speed driving on an off-road.

In the related technology, the air suspension technology provides a certain vertical stiffness by using an air spring with nonadjustable stiffness. Since the stiffness thereof is not adjustable according to the changes of the driving conditions, it is unable to function both on the paved road and on the off-road road etc. at the same time.

SUMMARY

An air spring with adjustable stiffness and a vehicle air suspension system are provided, to solve the problem that the stiffness of the air spring in the related technology cannot be adjusted according to changes of the driving conditions.

The air spring with adjustable stiffness and the vehicle air suspension system provided relate to the following technical solution.

An air spring with adjustable stiffness includes a main body consisting of an upper sealing plate, a lower sealing plate and a main air spring bellow, wherein an air spring bellow for adjustment is arranged in the main body, an inner space of the main body is divided by the air spring bellow for adjustment into a first region out of the air spring bellow for adjustment and a second region inside the air spring bellow for adjustment.

The first region and the second region are respectively connected to a gas source out of the main body, and a gas pressure in the first region and a gas pressure in the second region can be individually controlled.

By adopting the above technical solution, the stiffness of the air spring can be controlled. In addition, the stiffness of the air spring is adjusted by adjustment of the gas pressure in the second region, thus a stepless adjustment of the stiffness of the air spring can be realized.

Optionally, an open end of the air spring bellow for adjustment is tightly connected with the lower sealing plate, and the lower sealing plate is configured with a second gas opening in communication with the second region.

By adopting the above technical solution, it is convenient to product and assemble the air spring and is conducive to ensure the performance of the air spring.

Optionally, a plurality of air spring bellows for adjustment are provided, a first gas collection chamber is defined in the lower sealing plate, and the air spring bellow for adjustment is in communication with the first gas collection chamber.

By adopting the above technical solution, it is conducive to improve the pressure-bearing capacity of the air spring bellow for adjustment, so as to enlarge the adjusting range of the stiffness of the air spring.

Optionally, the open end of each of the plurality of air spring bellows for adjustment is provided with a base seat, a pressuring plate is arranged above the base seat, and the base plate is pressed and fixed between the pressuring plate and the lower sealing plate.

By adopting the above technical solution, it is convenient to install and remove the air spring bellow for adjustment, which can not only ensure the gas-tightness, but also facilitate the future maintenance.

Optionally, the air spring with adjustable stiffness further includes an anti-collision shield on the lower sealing plate, wherein the anti-collision shield includes a sleeve body, an upper end of the sleeve body is provided with a top protection plate, the top protection plate is configured with a gas passage, and the air spring bellow for adjustment is positioned in the anti-collision shield.

By adopting the above technical solution, the stiffness adjustment assembly can be effectively protected, to avoid the collision of the stiffness adjustment assembly due to too large deformation of the air spring, such that the service life of the air spring can be prolonged.

Optionally, the air spring with adjustable stiffness further includes a gas collection plate on the lower sealing plate, wherein a second gas collection chamber is defined in the gas collection plate, a lower side of the gas collection plate is configured with a third connection tube, the third connection tube is configured with a second gas opening in communication with the second gas collection chamber, the third connection tube passes through the lower sealing plate and is tightly connected with the lower sealing plate.

Each of the plurality of air spring bellows for adjustment is in communication with the second gas collection chamber via a respective third gas opening at the gas collection plate.

By adopting the above technical solution, it is conducive to improve the pressure-bearing capacity of the air spring bellow for adjustment, thereby enlarging the adjusting range of the stiffness of the air spring.

Optionally, the air spring bellow for adjustment is shaped as a spiral hose, the lower sealing plate is configured with a second gas opening, and an open end of the air spring bellow for adjustment is tightly connected with the second gas opening.

By adopting the above technical solution, it is conducive to improve the pressure-bearing capacity of the air spring bellow for adjustment on the one hand, so as to enlarge the adjusting range of the stiffness of the air spring. It is convenient to conduct a reliable tight connection on the other hand, ensuring the gas tightness based on the relatively small diameter of opening of the air spring bellow for adjustment.

Optionally, an anti-collision shield is arranged out of the air spring bellow for adjustment, the anti-collision shield includes a sleeve body, an upper end of the sleeve body is provided with a top protection plate, the top protection plate is configured with a gas passage, the sleeve body is provided with a plurality of supporters for supporting the air spring bellow for adjustment, and the plurality of supporters are arranged in a spiral manner.

By adopting the above technical solution, the stiffness adjustment assembly can be effectively protected on the one hand, to avoid the collision of the stiffness adjustment assembly due to too large deformation of the air spring, such that the service life of the air spring can be prolonged. The air spring bellow for adjustment in form of a spiral hose can be supported on the other hand, so as to ensure the stability of the spiral structure of the air spring bellow for adjustment.

Optionally, the open end of the air spring bellow for adjustment is tightly connected with the upper sealing plate, and the upper sealing plate is configured with a second gas opening in communication with the second region.

By adopting the above technical solution, it is convenient to product and assemble the air spring and is conducive to ensure the performance of the air spring.

Optionally, the main air spring bellow and the air spring bellow for adjustment are respectively connected with an external gas source via a pressure adjustment system.

By adopting the above technical solution, the gas pressures in the first region and the second region can be individually controlled.

A vehicle air suspension system is provided, in which an air spring of the vehicle air suspension system is configured as any one of the above air springs with adjustable stiffness. A vehicle includes the above vehicle air suspension system.

By adopting the above technical solution, the vehicle can adjust the stiffness of the air spring according to changes of the driving conditions, such that it can function on the conditions such as by driving on a paved road and by an off-road driving, completely improving the ride comfort and operation stability.

In Summary, at Least One of the Following Beneficial Technical Effects is Obtained:

1. The inner space of the air spring is divided into different regions, such that the stiffness of the air spring can be adjusted by the adjustment of the gas pressure in part regions, so as to adjust the stiffness of the air spring according to changes of the driving conditions, and it can function on the conditions such as by driving on a paved road and by an off-road driving, completely improving the ride comfort and operation stability.
2. The stiffness of the air spring can be adjusted by the gas pressure in the air spring, so as to achieve a stepless adjustment of the stiffness, so that the control of the stiffness is more flexible and convenient.
3. The stiffness adjustment assembly is completely arranged in the air spring in the present application, thereby no change on an external structure of the air spring is required, which is more able to adjust to the current limited mounting space of the air spring, so that the product has a better feasibility and adaptability.

DETAILED DESCRIPTION

The present application is further described in detail below in combination with FIGS. 1-22.

Embodiment 1

Figure 1:
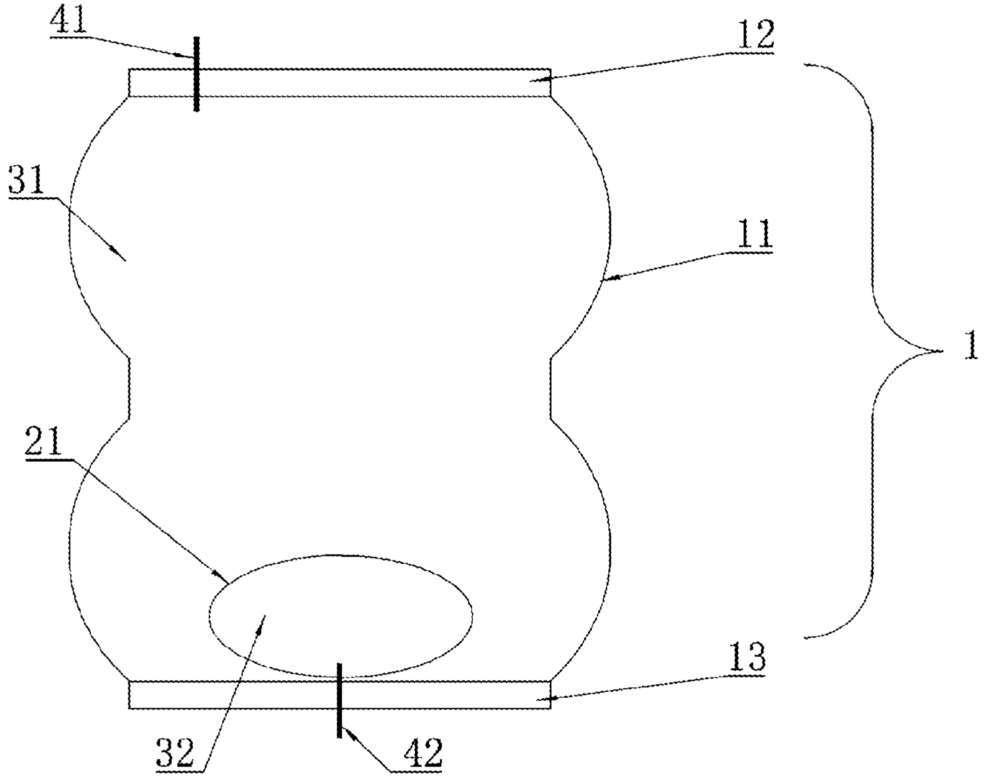
FIG. 1 is a principle diagram of the air spring.

As shown in FIG. 1, an air spring with adjustable stiffness includes a main body 1. The main body 1 includes a main air spring bellow 11 with openings respectively at the upper end and the lower end thereof. The upper end of the main air spring bellow 11 is provided with an upper sealing plate 12 for closing the opening at the upper end, and the upper end of the main air spring bellow 11 is tightly connected with the upper sealing plate 12. The lower end of the main air spring bellow 11 is provided with a lower sealing plate 13 for sealing the opening at the lower end, and the lower end of the main air spring bellow 11 is tightly connected with the lower sealing plate 13. The main air spring bellow 11, the upper sealing plate 12 and the lower sealing plate 13 together form a closed system for accommodating high-pressure gas, which constitutes the main body 1 of the air spring. The high-pressure gas can support the sprung mass on the upper sealing plate 12.

A stiffness adjustment assembly is arranged in the main body 1. The stiffness adjustment assembly includes an air spring bellow for adjustment 21 with an open end. The open end of the air spring bellow for adjustment 21 is connected with the main body 1, and the air spring bellow for adjustment 21 divides the inner space of the main body 1 into different regions. To facilitate the description, the region out of the air spring bellow for adjustment 21 is defined as a first region 31, while the region inside the air spring bellow for adjustment 21 is defined as a second region 32. The main body 1 is respectively configured with a first gas opening 41 in communication with the first region 31 and a second gas opening 42 in communication with the second region 32. The first gas opening 41 and the second gas opening 42 are respectively connected to an external gas source via a pressure adjustment system. The gas pressure in the first region 31 and the second region 32 can be individually controlled by the pressure adjustment system.

Figure 23:
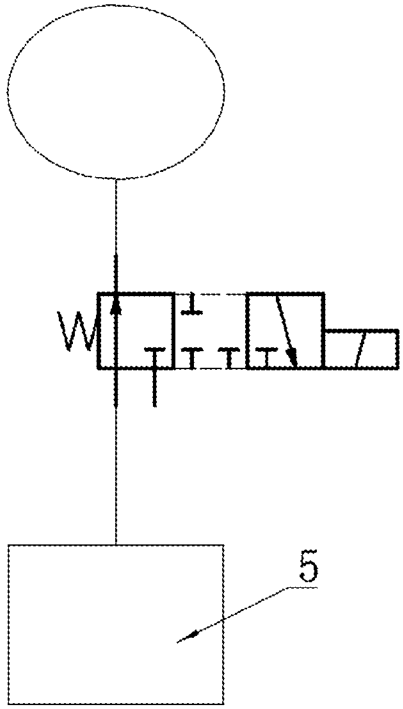
FIG. 23 is a principle diagram of the pressure adjustment system.

As an embodiment shown in FIG. 23, the gas source in this embodiment adopts a high-pressure gas source 5. The first gas opening 41 and the second gas opening 42 are respectively connected to the high-pressure gas source 5 via a pipe. The pressure adjustment system includes a controller, sensors for respective detecting the gas pressure in the first region and the second region, and a solenoid valve at the pipe. The controller controls on and off of the solenoid valve according to the pressure signal coupled back by the sensors, so as to control the gas pressure in the first region and the second region.

As an embodiment, the first gas opening 41 in this embodiment is defined at the upper sealing plate 12. The upper sealing plate 12 is configured with a first pressure measuring opening (not shown). The first pressure measuring opening is provided with a sensor (not shown) for detecting the gas pressure in the first region 31. The main air spring bellow 11 and the air spring bellow for adjustment 21 are made of rubber and/or textile materials.

Figure 2:
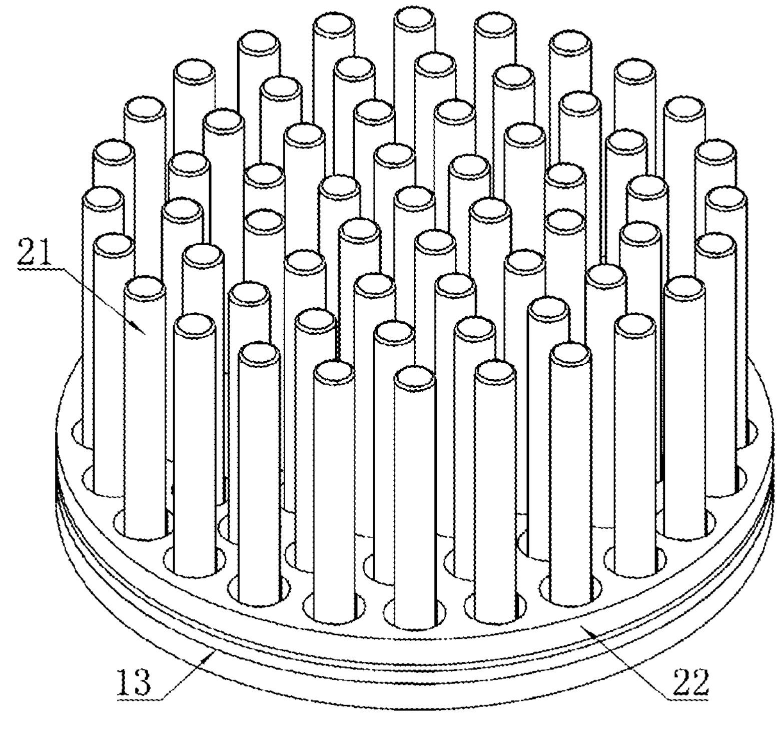
FIG. 2 is a schematic stereogram of the mounting structure of the stiffness adjustment assembly.
Figure 3:
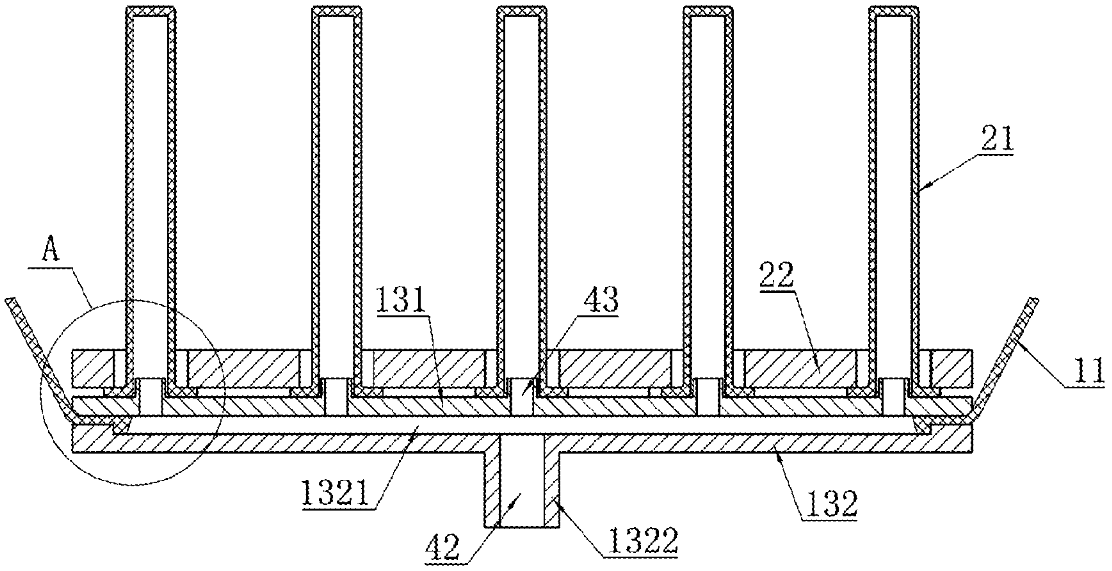
FIG. 3 is a section view of the mounting structure of the stiffness adjustment assembly.

As shown in FIG. 2 and FIG. 3, the stiffness adjustment assembly includes a plurality of air spring bellows for adjustment 21, and each of the air spring bellows for adjustment 21 is configured with an opening at lower end. The opening at lower end of the air spring bellow for adjustment 21 is tightly connected with the lower sealing plate 13 of the main body 1. The lower sealing plate 13 is hollow, and the inner chamber thereof is defined as a first gas collection chamber. The lower side of the lower sealing plate 13 is configured with a second gas opening 42 in communication with the first gas collection chamber. The upper side of the lower sealing plate 13 is configured with a plurality of third gas openings 43 in communication with the first gas collection chamber. The number of the third gas openings 43 is the same as the number of the air spring bellows for adjustment 21, and the position of each third gas opening 43 is corresponding to that of each air spring bellow for adjustment 21. Each of the air spring bellows for adjustment 21 is in communication with the first gas collection chamber via corresponding one of the third gas openings 43.

Preferably, the plurality of air spring bellows for adjustment 21 are uniformly distributed on the lower sealing plate 13. The lower side of the lower sealing plate 13 is configured with a first connection tube 1322 and a second pressure measuring opening (not shown). The second gas opening 42 is defined at the first connection tube 1322. The second pressure measuring opening is provided with a sensor (not shown) for detecting the gas pressure in the second region. The upper side of the lower sealing plate 13 is configured with a second connection tube 1311. The third gas opening 43 is defined at the second connection tube 1311.

Figure 4:
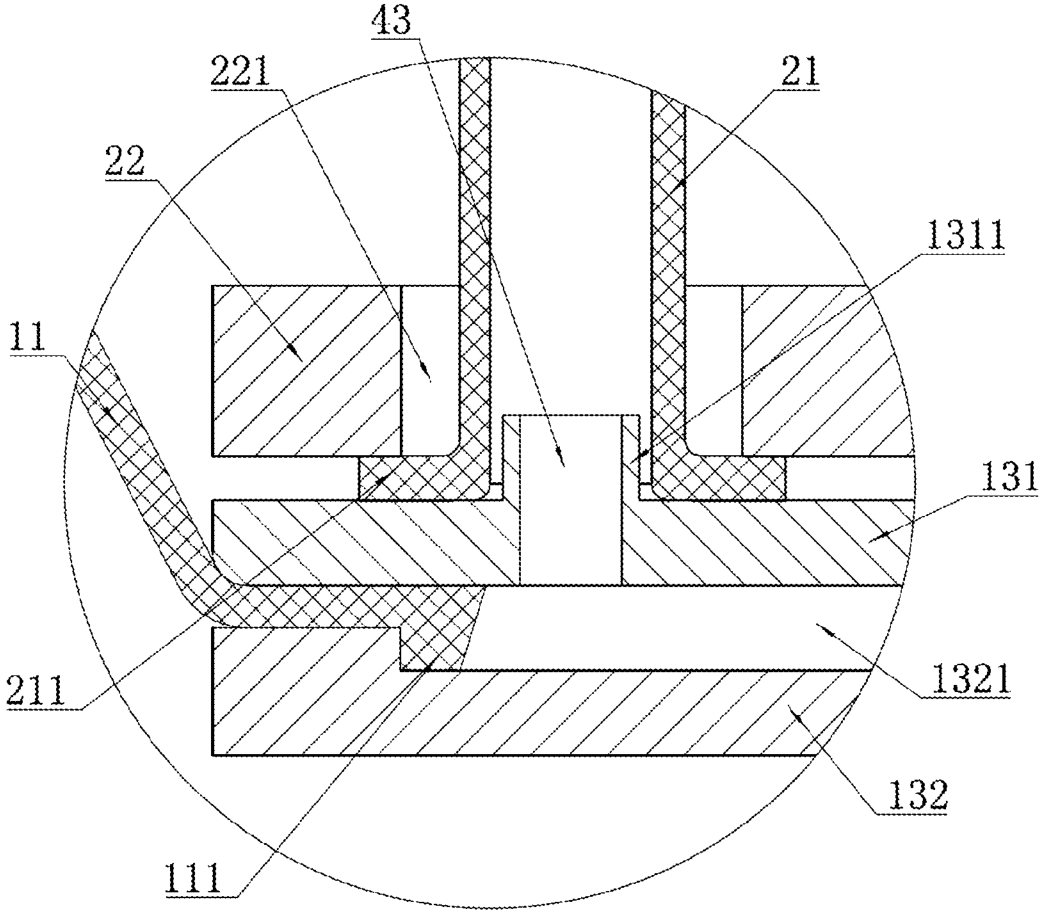
FIG. 4 is an enlarged structural diagram of portion A in FIG. 3.
Figure 5:
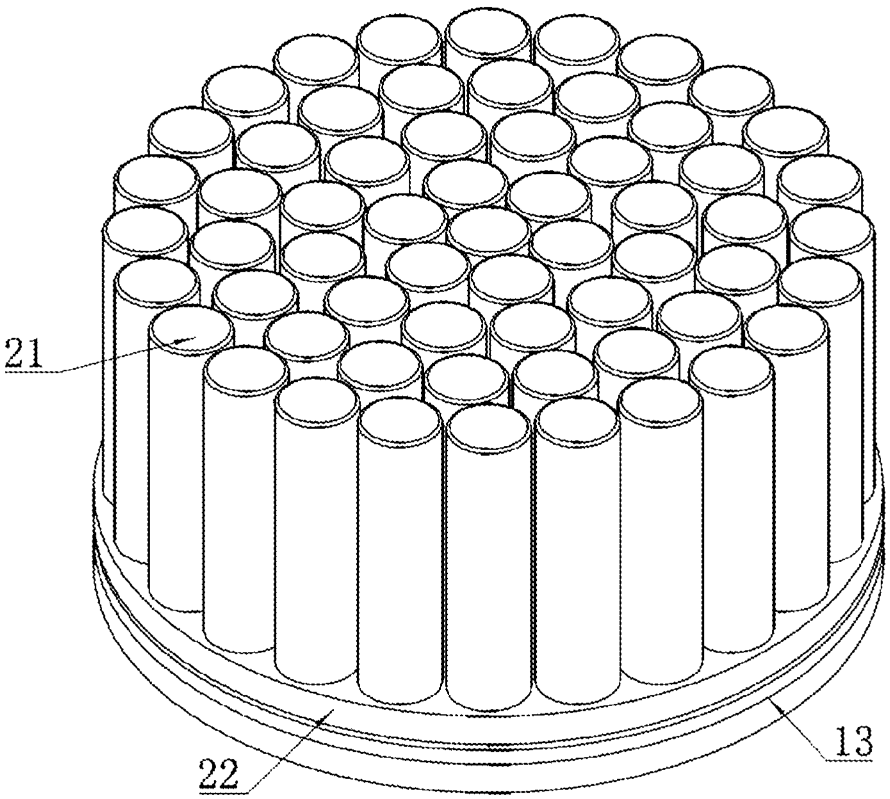
FIG. 5 is a diagram showing the air spring bellow for adjustment in the stiffness adjustment assembly under high pressure.

As an embodiment shown in FIG. 3 and FIG. 4, the lower sealing plate 13 in this embodiment includes a cover plate 131 and a base plate 132 from top to bottom successively. The lower edge of the main air spring bellow 11 is clamped and fixed between the cover plate 131 and the base plate 132. The cover plate 131 is fixedly connected with the base plate 132. The cover plate 131 and/or the base plate 132 are/is configured with a groove 1321 on the opposite faces thereof. The inner space of the groove 1321 serves as the first gas collection chamber. As an embodiment, the face of the base plate 132 opposite to the cover plate 131 is configured with the groove 1321 in this embodiment, that is, the upper side of the base plate 132 is configured with the groove 1321.

Further, as shown in FIG. 4, the lower edge of the main air spring bellow 11 is configured with a first flange 111 inside the groove 1321, wherein the first flange extends towards the bottom of the groove 1321. The connection reliability and the tightness between the main air spring bellow 11 and the lower sealing plate 13 can be ensured by the first flange 111, so as to prevent the lower edge of the main air spring bellow 11 from removing out of the lower sealing plate 13.

As an embodiment shown in FIG. 3 and FIG. 4, the opening at lower end of the air spring bellow for adjustment 21 is provided with a base seat 211 horizontally extending outward. The base seat 211 and the air spring bellow for adjustment 21 adopt the same material and are integrally formed. A pressuring plate 22 is arranged above the lower sealing plate 13. The pressuring plate 22 is configured with reserved holes 221 respectively corresponding to the air spring bellows for adjustment 21. The upper portion of the air spring bellow for adjustment 21 passes through the reserved hole 221 and extends up to a position above the pressuring plate 22. The pressuring plate 22 is fixedly connected with the lower sealing plate 13. The diameter of the reserved hole 221 is smaller than the outer diameter of the base seat 211. The base seat 211 of the air spring bellow for adjustment 21 is sealed and pressed between the pressuring plate 22 and the lower sealing plate 13.

The air spring bellow for adjustment 21 can be configured as a bladder or a hose. As an embodiment, the air spring bellow for adjustment 21 in this embodiment is configured as a circular cylindrical hose.

Figure 9:
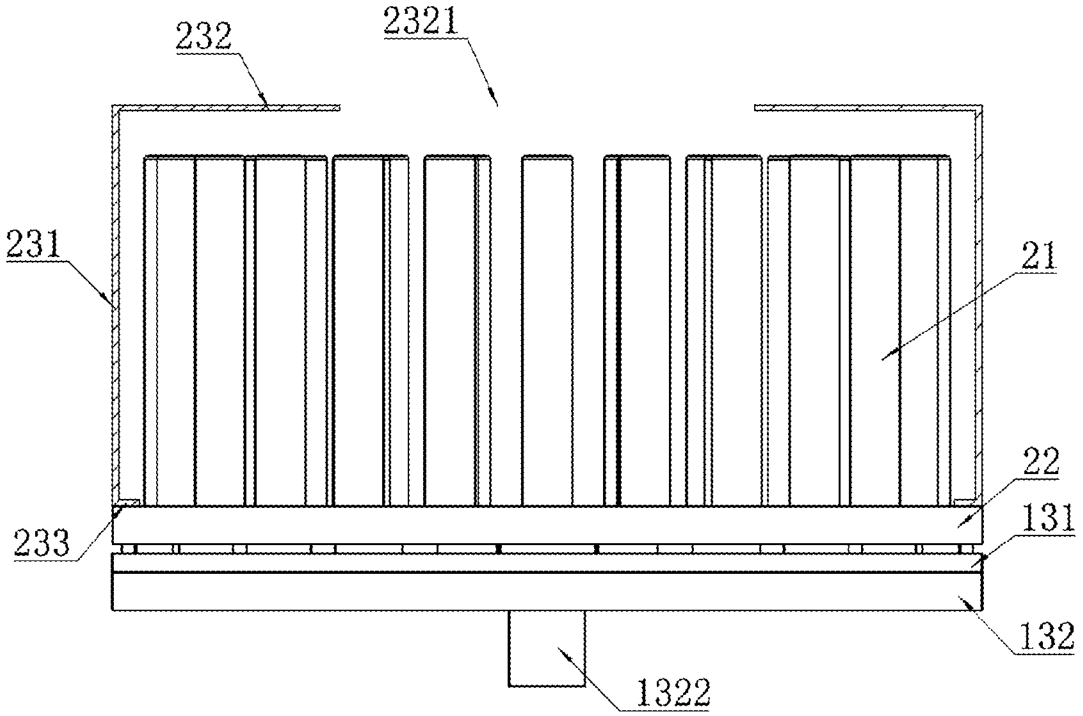
FIG. 9 is a diagram showing the mounting structure of an anti-collision shield.
Figure 10:
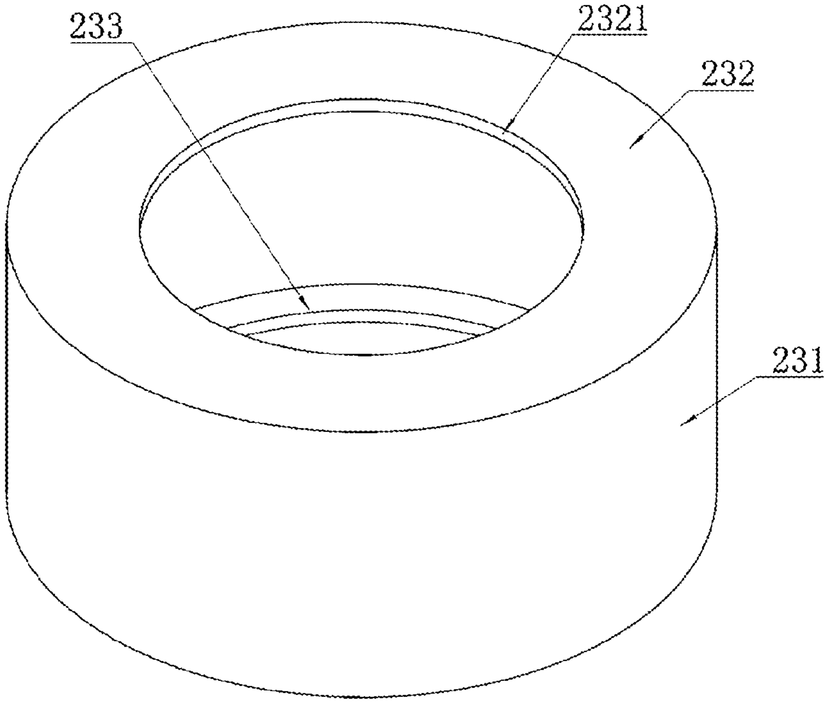
FIG. 10 is a schematic stereogram of the anti-collision shield.

Further, the stiffness adjustment assembly further includes an anti-collision shield 23 as shown in FIG. 9 and FIG. 10, in order to avoid damage of the air spring bellow for adjustment 21 caused by collision between the upper sealing plate 12 and the air spring bellow for adjustment 21 due to the excessive deformation of the air spring. The air spring bellow for adjustment 21 is positioned in the anti-collision shield 23.

As an embodiment, the anti-collision shield 23 in this embodiment includes a sleeve body 231 in a shape of a circular cylindrical sleeve. An upper end of the sleeve body 231 is provided with a top protection plate 232 extending radially inwards. The top protection plate 232 is configured with a gas passage 2321. The top protection plate 232 here is configured with one or more gas passages 2321. The top protection plate 232 in this embodiment is configured with one gas passage 2321, and the gas passage 2321 is coaxial with the top protection plate 232. The top protection plate 232 as a whole is in an annular shape.

A lower end of the sleeve body 231 is configured with a flanging 233 being folded inwards. The flanging 233 is fixedly connected to the pressuring plate 22 through a screw.

The stiffness adjustment assembly is adaptive to adjust the stiffness of the air spring. When in use, the volume and internal gas pressure of the air spring bellow for adjustment 21 can be changed by charging and discharging of the air spring bellow for adjustment 21 in the stiffness adjustment assembly. The volume of the air spring bellow for adjustment 21 and the internal pressure will affect the stiffness of the air spring, so as to adjust the stiffness of the entire air spring. The gas is charged in the air spring bellow for adjustment 21 in the stiffness adjustment assembly when it is required to increase the stiffness of the air spring, so as to increase the gas pressure in the air spring bellow for adjustment 21. On the contrary, a certain amount of gas is discharged from the air spring bellow for adjustment 21, so as to decrease the stiffness of the air spring.

The implementation principle of the embodiment of the present application is as follows.

Factor I: The high-pressure gas in the air spring will produce resistance when the air spring is compressed, and the gas pressure in the air spring will increase accordingly.

Factor II: The internal gas pressure of the air spring is the main factor that influences the stiffness of the air spring. When other conditions are same, the higher the gas pressure in the air spring is, the larger the stiffness of the air spring is. On the contrary, the smaller the gas pressure in the air spring is, the smaller the stiffness of the air spring is. Intuitively by the same force on the air spring, the air spring is difficult to be compressed when the gas pressure in the air spring is relatively large, which results in a smaller deformation of the air spring, that is, the air spring has a higher stiffness; when the gas pressure in the air spring is relatively small, the air spring is easier to be compressed, which results in a larger deformation of the air spring, that is, the air spring has a lower stiffness.

Considering the above factor I in combination with factor II, the gas pressure in the air spring bellow for adjustment 21 can be controlled by providing the air spring bellow for adjustment 21 in the main body 1 of the air spring according to the present application, so as to change the gas pressure of part regions in the main body 1 of the air spring, to realize the adjustment of the stiffness of the air spring. When a force is so exerted on the air spring, the gas in the first region 31 out of the air spring bellow for adjustment 21 and the gas in the air spring bellow for adjustment 21 are compressed at the same time. However, different gas pressures in the first region 31 and the air spring bellow for adjustment 21 lead to different resistance effects. The existence of high-pressure gas in the air spring bellow for adjustment 21 makes it more difficult for the air spring to be compressed, that is, the stiffness of the air spring becomes larger. By considering a more intuitive extreme case, the volume of the second region 32 will continue to increase while the volume of the first region 31 will continue to decrease, when the air spring bellow for adjustment 21 is continuously filled with high-pressure gas. When in extreme case the internal space of the main body 1 of the air spring is fully occupied by the air spring bellow for adjustment 21, the overall stiffness of the air spring is infinitely close to the stiffness of the air spring bellow for adjustment 21. That is, the overall stiffness of the air spring is determined by the gas pressure in the second region 32, and the air spring possesses the maximum stiffness $K_{max}$. When the air spring bellow for adjustment 21 is continuously discharged, the volume of the first region 31 will continue to increase, while the volume of the second region 32 will continue to decrease. When in extreme case the air spring bellow for adjustment 21 is completely flattened, the overall stiffness of the air spring is infinitely close to the stiffness of a single main air spring bellow 11, that is, the overall stiffness of the air spring is determined by the gas pressure in the first region 31, and the air spring possesses the minimum stiffness $K_{min}$. The gas pressure in the air spring bellow for adjustment 21 is adjusted by charging and discharging of the air spring bellow for adjustment 21, so that the overall stiffness of the air spring can varies between the maximum stiffness $K_{max}$ and the minimum stiffness $K_{min}$.

Further, a mathematic modeling is established for the air spring of the present application, in order to explain the feasibility and rationality of the stiffness adjustment of the present application.

Figure 7:
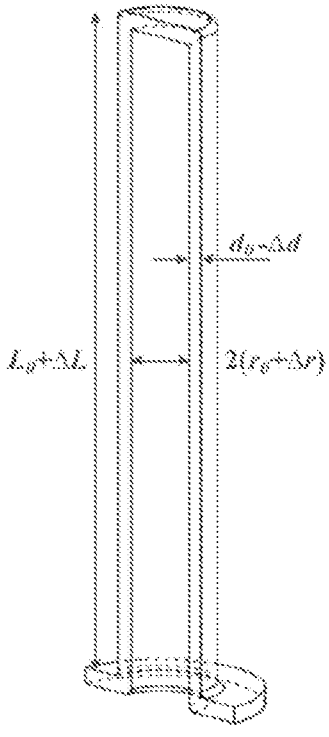
FIG. 7 is a parameter diagram when establishing a mathematical modeling for the air spring bellow for adjustment.
Figure 8:
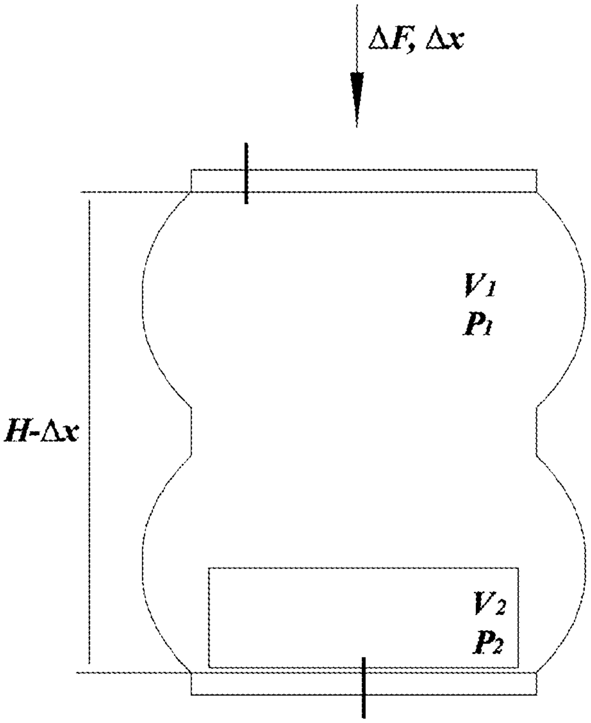
FIG. 8 a parameter diagram when establishing a mathematical modeling for the air spring.

As shown in FIG. 7 and FIG. 8, the gas pressure in the first region 31 of the air spring is designated as $P_1$, and the pressure in the second region 32 is designated as $P_2$.

Figure 6:
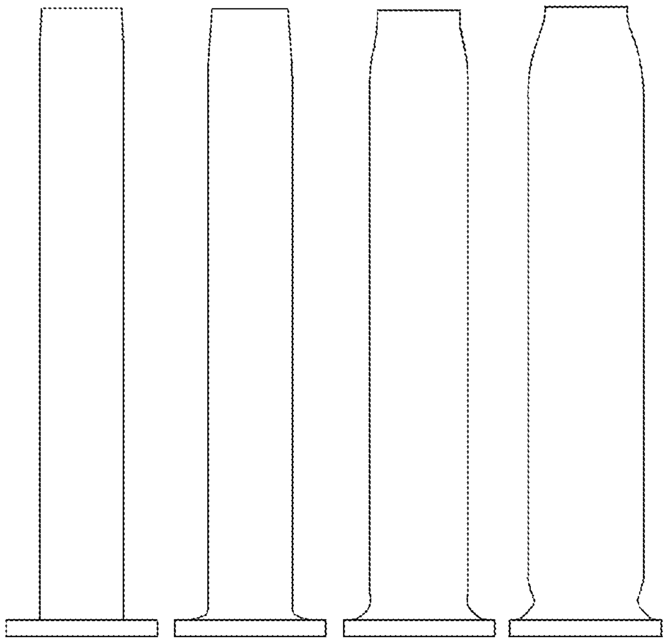
FIG. 6 is a diagram showing shape changing of the air spring bellow for adjustment when the pressure in the air spring bellow for adjustment is increased.

As shown in FIG. 6, according to the finite element analysis and simulant results, the length change of the air spring bellow for adjustment 21 can be ignored, since the length change of the air spring bellow for adjustment 21 is less than 6% of the length of the not stretched air spring bellow for adjustment during establishing the mathematical modeling. Assuming that the air spring bellow for adjustment 21 only gets deformed in radial direction, its Poisson's ratio can be expressed as:

$$\mu = \frac{\Delta d/d_0}{2\pi\Delta r/2\pi r_0} = \frac{\Delta d/d_0}{\Delta r/r_0} \tag{1}$$

wherein $r_0$ represents the inner diameter of the air spring bellow for adjustment 21 when $P_1=P_2$, and $d_0$ represents the wall thickness of the air spring bellow for adjustment 21 when $P_1=P_2$, as shown in FIG. 7.

When the air spring bellow for adjustment 21 is stretched, the radial strain $\varepsilon_0$ (proportional deformation) is:

$$\varepsilon_r = \frac{2\pi(r_0+\Delta r) - 2\pi r_0}{2\pi r_0} = \frac{\Delta r}{r_0} \tag{2}$$

Due to Poisson effect, according to formula (1), the change in wall thickness of the air spring bellow for adjustment 21 can be expressed as:

$$\Delta d = \mu\frac{\Delta r}{r_0}d_0 = \mu\epsilon_r d_0 \tag{3}$$

According to the force-balance principle of the sleeve body, the following formula is obtained:

$$F=2(r_0+\Delta r)(P_2-P_1)L=2(d-\Delta d)\sigma_r \tag{4}$$

wherein stress $\sigma_r$ is obtained by dividing the force on the air spring bellow for adjustment 21 by the corresponding area, namely the force per unit area:

$$\sigma_r = \frac{F}{A} = \frac{2(r_0+\Delta r)L}{2(d_0-\Delta d)L}\Delta P = \frac{(1+\varepsilon_r)r_0}{(1-\mu\varepsilon_r)d_0}\Delta P \tag{5}$$

wherein the pressure difference $\Delta P$ is:

$$\Delta P=P_2-P_1 \tag{6}$$

The Young's modulus E quantifies the relationship between the tensile stress $\sigma_r$ and the axial strain $\varepsilon_r$ in the linear elastic region of the material, which is as follows:

$$\sigma_r=\varepsilon_r E \tag{7}$$

According to formulas (5) and (7), it can be concluded that $$\frac{(1+\varepsilon_r)r_0}{(1-\mu\varepsilon_r)d_0}\Delta P=\varepsilon_r E$$
$$\Longrightarrow(1+\varepsilon_r)r_0\Delta P=\varepsilon_r E(1-\mu\varepsilon_r)d_0$$
$$\Longrightarrow r_0\Delta P+\varepsilon_r r_0\Delta P=\varepsilon_r Ed_0-\underbrace{\mu Ed_0\varepsilon_r^2}_{\approx 0}$$

Based on the assumption that the low strain system $$\varepsilon_r^2\approx 0,$$

it can be concluded that:

$$\varepsilon_r\approx\frac{r_0\Delta P}{Ed_0-r_0\Delta P}\tag{8}$$

According to formulas (2) and (8), the change of the inner diameter of the air spring bellow for adjustment 21 can be written as:

$$\Delta r=\varepsilon_r r_0=\frac{r_0^2\Delta P}{Ed_0-r_0\Delta P}\tag{9}$$

According to formulas (3) and (8), the change in wall thickness of the air spring bellow for adjustment 21 can be written as:

$$\Delta d=\mu\varepsilon_r d_0=\frac{\mu d_0 r_0\Delta P}{Ed_0-r_0\Delta P}\tag{10}$$

The total volume of the air spring bellow for adjustment 21 can be calculated as follows (when ignoring the change in wall thickness of the sleeve):

$$V_2=\pi(r_0+\Delta r)^2\alpha L_0=\pi\left(r_0^2+2\varepsilon r_0^2+\underbrace{\Delta r^2}_{\approx 0}\right)\alpha L_0\approx\underbrace{\pi\alpha L_0 r_0^2}_{\overline{V}_0}+\underbrace{\frac{2\pi\alpha L_0 r_0^3}{Ed}}_{C}(P_2-P_1)\tag{11}$$

wherein α represents the number of the air spring bellow for adjustments 21.

Assuming that the gas pressures in the first region 31 and the second region 32 of the air spring under the load $F_0$ are respectively set as $$P_1^0 \text{ and } P_2^0,$$

and the corresponding original volume of the second region 32 is $$V_2^0,$$

the entire volume of the air spring is $$V_0=V_1^0+V_2^0.$$

According to formula (11), the original volume of the second region 32 is:

$$V_2^0\approx\pi\alpha L_0 r_0^2+\frac{2\pi\alpha L_0 r_0^3}{Ed_0}(P_2^0-P_1^0)=\overline{V}_0+C(P_2^0-P_1^0)\tag{12}$$

The original volume of the first region 31 of the air spring is:

$$V_1^0=V_0-V_2^0\tag{13}$$

When the original load $F_0$ is turned into $F_0+\Delta F$, the gas pressure $$P_1^0$$

will be turned into $$P_1^0+\Delta P_1.$$

According to the ideal gas law, the following equation can be derived:

$$\begin{aligned}V_1^0P_1^0&=(V_1^0-\Delta V_1+\Delta V_2)(P_1^0+\Delta P_1)\\V_2^0P_2^0&=(V_2^0-\Delta V_2)(P_2^0+\Delta P_2)\end{aligned}\tag{14}$$

For simplification, the following equation can be obtained by only considering the linear part of formula (14):

$$\begin{aligned}\Delta P_1V_1^0&=P_1^0(\Delta V_1-\Delta V_2)\\\Delta P_2V_2^0&=P_2^0\Delta V_2\end{aligned}\tag{15}$$

In turn the following equation can be obtained:

$$\Delta P_2-\Delta P_1=\frac{P_2^0\Delta V_2}{V_2^0}-\frac{P_1^0(\Delta V_1-\Delta V_2)}{V_1^0}\tag{16}$$

According to formulas (11) and (12), the volume change $\Delta V_2$ of the second region 32 can be written as:

$$\begin{aligned}&V_2=V_2^0-\Delta V_2\\&\Longrightarrow\pi\alpha Lr_0^2+\frac{2\pi\alpha L_0r_0^3}{Ed}(P_2-P_1)=\pi\alpha L_0r_0^2+\frac{2\pi\alpha L_0r_0^3}{Ed}(P_2^0-P_1^0)-\Delta V_2\\&\Longrightarrow\Delta V_2=\frac{2\pi\alpha L_0r_0^3}{Ed}(\Delta P_1-\Delta P_2)=C(\Delta P_1-\Delta P_2)\end{aligned}\tag{17}$$

wherein $$\Delta P_2 = P_2 - P_2^0,\ \Delta P_1 = P_1 - P_1^0.$$

By combining formulas (16) and (17), the following equation can be obtained:

$$\frac{P_2^0 \Delta V_2}{V_2^0} - \frac{P_1^0(\Delta V_1 - \Delta V_2)}{V_1^0} = -\frac{\Delta V_2}{C} \tag{18}$$

$$\left(\frac{P_2^0}{V_2^0} + \frac{P_1^0}{V_1^0} + \frac{1}{C}\right)\Delta V_2 = \frac{P_1^0}{V_1^0}\Delta V_1$$

$$\Rightarrow \Delta V_2 = \underbrace{\left(\frac{P_2^0}{V_2^0} + \frac{P_1^0}{V_1^0} + \frac{1}{C}\right)^{-1}\frac{P_1^0}{V_1^0}}_{e}\Delta V_1$$

According to formulas (15) and (18), the volume change of the first region 31 of the air spring can be represented as:

$$\Delta V_1 = \frac{\Delta P_1 V_1^0}{P_1^0} + \Delta V_2 = \frac{V_1^0}{(1-e)P_1^0}\Delta P_1 \tag{19}$$

By combining formulas (15) and (18), the gas pressure change in the second region 32 can be written as:

$$\Delta V_2 = e\Delta V_1 = \frac{eV_1^0}{(1-e)P_1^0}\Delta P_1 \tag{20}$$

$$\Rightarrow \Delta P_2 = \frac{P_2^0}{V_2^0}\Delta V_2 = \frac{eV_1^0 P_2^0}{(1-e)V_2^0 P_1^0}\Delta P_1 = \frac{eV_1^0 P_2^0}{(1-e)V_2^0 P_1^0 A}\Delta F$$

The total volume change of the air spring is as follows:

$$\Delta x A = \Delta V_1 + \Delta V_2 = \Delta V_1 + e\Delta V_1 = \frac{(1+e)V_1^0}{(1-e)AP_1^0}\Delta F$$

Therefore, the stiffness of the air spring can be expressed as:

$$K = \frac{\Delta F}{\Delta x} = \frac{A^2 P_1^0}{V_1^0}\frac{(1-e)}{(1+e)} = \frac{A^2 P_1^0}{V_0 - V_2^0}\frac{(1-e)}{(1+e)} = \frac{A^2 P_1^0}{V_0 - \overline{V_0} - C(P_2^0 - P_1^0)}\frac{(1-e)}{(1+e)} \tag{21}$$

wherein $$C = \frac{2\pi\alpha L_0 r_0^3}{Ed_0}$$

$$\overline{V_0} = \pi r_0^2 \alpha L_0$$

$$e = \left(\frac{P_2^0}{V_2^0} + \frac{P_1^0}{V_1^0} + \frac{1}{C}\right)^{-1}\frac{P_1^0}{V_1^0}$$

In general, the original pressure $$P_1^0$$

of the air spring is determined by the vehicle load and the height of suspension. Therefore, the stiffness of the air spring can be adjusted by controlling the original gas pressure $$P_2^0$$

of the second region 32.

Embodiment 2

Figure 11:
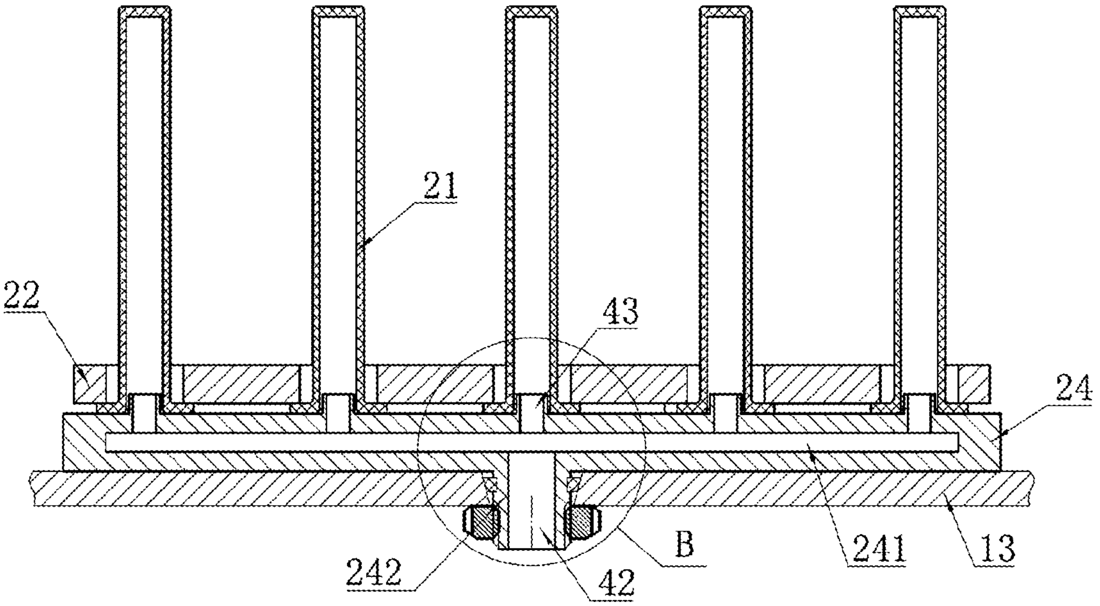
FIG. 11 is a diagram showing the mounting structure of the stiffness adjustment assembly in Embodiment 2.
Figure 12:
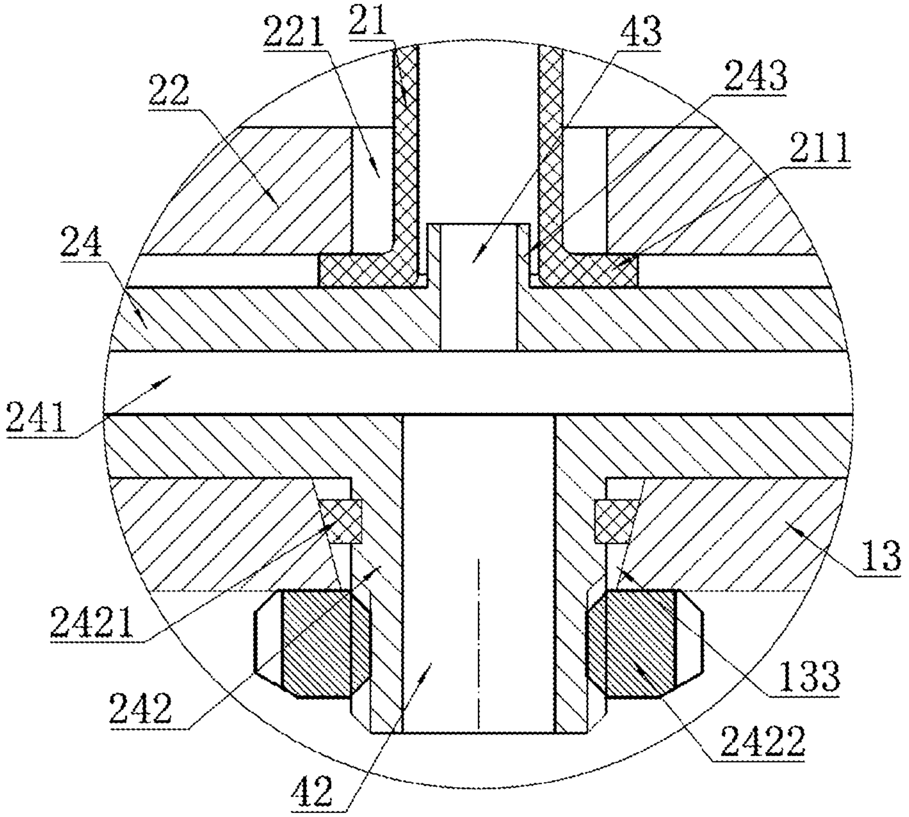
FIG. 12 is an enlarged structural diagram of portion B in FIG. 11.

As shown in FIG. 11 and FIG. 12, the lower sealing plate 13 is a solid plate, that is, the first gas collection chamber of the lower sealing plate 13 is removed.

The stiffness adjustment assembly includes a gas collection plate 24 above the lower sealing plate 13. The gas collection plate 24 is hollow, the internal cavity thereof is the second gas collection chamber 241. The lower side of the gas collection plate 24 is configured with a third connection tube 242. The third connection tube 242 is configured with a second gas opening 42 in communication with the second gas collection chamber 241. The third connection tube 242 runs through the lower sealing plate 13 and extends up to a position below the lower sealing plate 13. The lower sealing plate 13 is configured with a mounting hole 133 for accommodating the third connection tube 242. The third connection tube 242 is tightly connected with the lower sealing plate 13.

As an embodiment, the mounting hole 133 in this embodiment is a conical hole with an upper end with larger diameter and a lower end with smaller diameter. A sealing ring 2421 is arranged at the third connection tube 242. The third connection tube 242 is provided with a locking nut 2422 under the lower sealing plate 13. The sealing ring 2421 is pressed and sealed on the conical surface of the mounting hole 133 under the locking nut 2422. Preferably, the outer circular cylinder surface of the third connection tube 242 is configured with a mounting groove for accommodating the sealing ring 2421.

As an embodiment, the lower side of the gas collection plate in this embodiment is configured with a pressure measuring tube (not shown) in communication with the second gas collection chamber 241. The pressure measuring tube runs through the lower sealing plate 13 and extends up to a position below the lower sealing plate 13. The pressure measuring tube is in tightly connected with the lower sealing plate 13. Preferably, the connection structure between the pressure measuring tube and the lower sealing plate 13 is the same as the connection structure between the third connection tube 242 and the lower sealing plate 13, which won't be repeatedly described. A sensor (not shown) is mounted at the pressure measuring tube.

The upper side of the gas collection plate 24 is configured with a fourth connection tube 243. The fourth connection tube 243 is configured with a third gas opening 43 in communication with the second gas collection chamber 241. There are a plurality of the fourth connection tubes 243, which are respectively corresponding to the air spring bellows for adjustment 21. Each of the air spring bellows for adjustment 21 is in communication with the second gas collection chamber 241 via the corresponding fourth connection tube 243.

A pressuring plate 22 is arranged above the gas collection plate 24. The pressuring plate 22 is configured with reserved holes 221 respectively corresponding to the air spring bellows for adjustment 21. The upper portion of the air spring bellow for adjustment 21 runs through the reserved hole 221 and extends to a position above the pressuring plate 22. The pressuring plate 22 is fixedly connected with the gas collection plate 24. The diameter of the reserved hole 221 is smaller than the outer diameter of the base seat 211. The base seat 211 of the air spring bellow for adjustment 21 is sealed and pressed between the pressuring plate 22 and the gas collection plate 24.

The remaining structures are the same as Embodiment 1.

Embodiment 3

Figure 13:
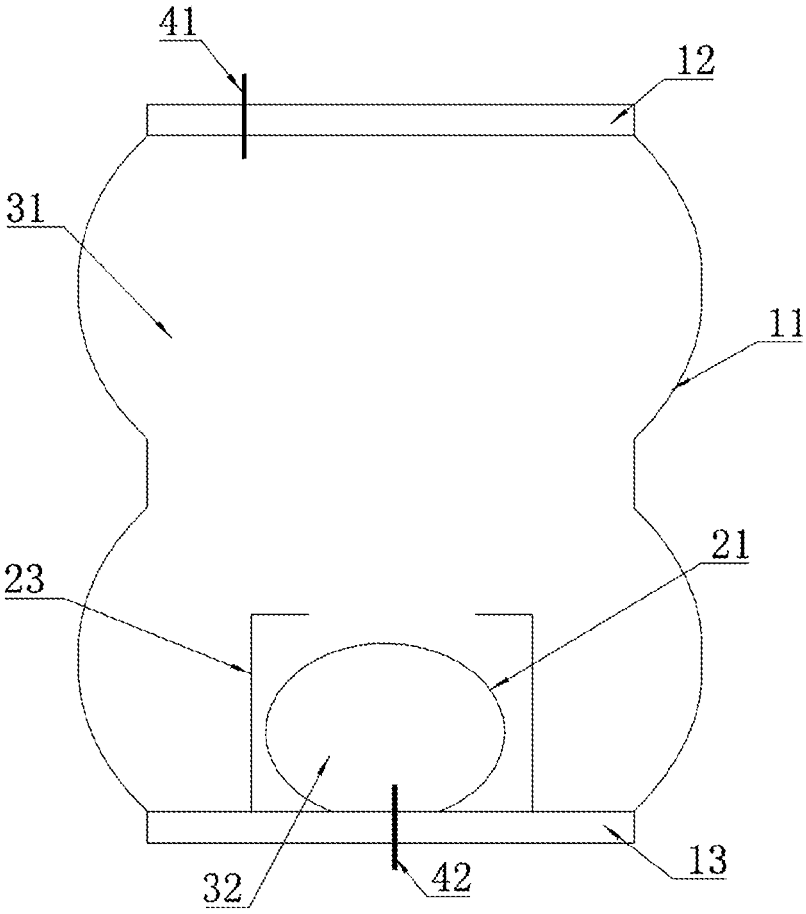
FIG. 13 is a diagram of an air spring in Embodiment 3.

As shown in FIG. 13, the stiffness adjustment assembly includes only one air spring bellow for adjustment 21. The air spring bellow for adjustment 21 can be configured as a bladder or a circular cylinder sleeve with a closed upper end and an open lower end. As an embodiment, the air spring bellow for adjustment 21 in this embodiment is configured as a bladder.

Figure 14:
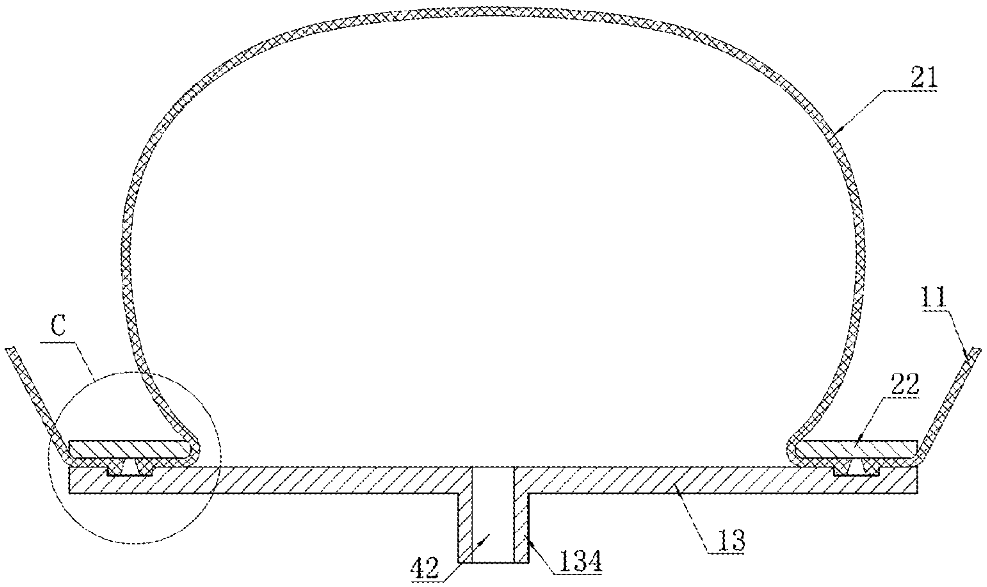
FIG. 14 is a diagram showing the mounting structure of the stiffness adjustment assembly in Embodiment 3.
Figure 15:
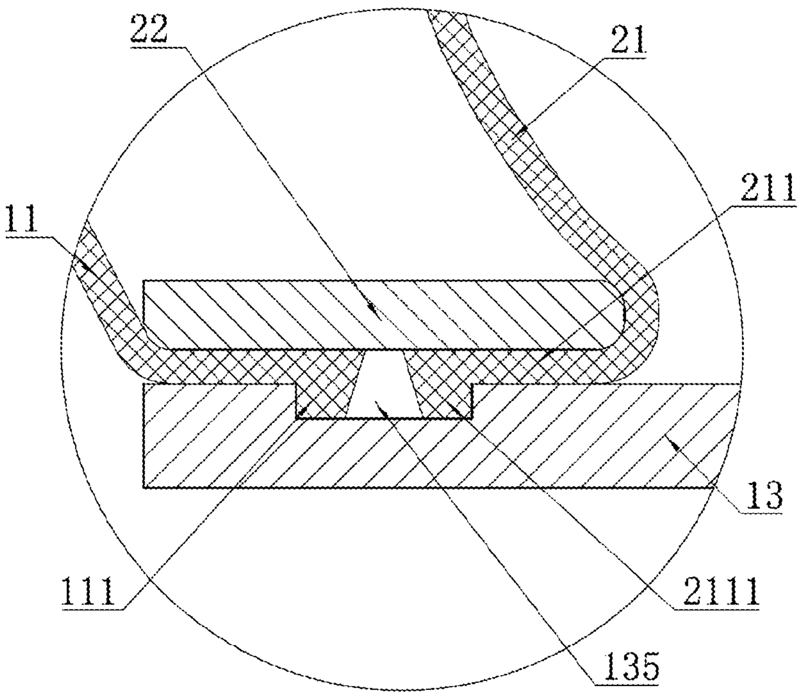
FIG. 15 is an enlarged structural diagram of portion C in FIG. 14.

As shown in FIG. 14 and FIG. 15, the air spring bellow for adjustment 21 includes a bladder body with an opening at lower end. The lower end of the bladder body is provided with a base seat 211 which horizontally extends outwards. A pressuring plate 22 is wrapped around the air spring bellow for adjustment 21 and is positioned above the base seat 211 of the air spring bellow for adjustment 21. The base seat 211 of the air spring bellow for adjustment 21 is pressed and fixed between the pressuring plate 22 and the lower sealing plate 13. The pressuring plate 22 is fixedly connected with the lower sealing plate 13. A portion of the lower sealing plate 13 in the air spring bellow for adjustment 21 is provided with is configured with a fifth connection tube 134 and a second pressure measuring opening (not shown) in communication with interior of the air spring bellow for adjustment 21. The fifth connection tube 134 is configured with a second gas opening 42. The second pressure measuring opening is provided with a sensor (not shown) for detecting the gas pressure in the second region 32.

Further, the upper side of the lower sealing plate 13 is configured with a snapping groove 135 that is positioned out of the base seat 211 of the air spring bellow for adjustment 21. The outer end of the base seat 211 extends up to a position above the snapping groove 135. The lower side of the base seat 211 is configured with a second flange 2111 extending downwards up to interior of the snapping groove 135. The reliability of the tight connection between the air spring bellow for adjustment 21 and the lower sealing plate 13 can be ensured by the second flange 2111, so as to prevent the lower edge of the air spring bellow for adjustment 21 from slipping off between the pressuring plate 22 and the lower sealing plate 13.

Further, the air spring bellow for adjustment 21 and the main air spring bellow 11 share one the pressuring plate 22, that is, the lower edge of the main air spring bellow 11 is pressed and fixed between the lower sealing plate 13 and the outer edge of the pressuring plate 22. The first flange 111 at the lower edge of the main air spring bellow 11 is positioned in the snapping groove 135.

The remaining structures are the same as Embodiment 1.

Embodiment 4

Figure 16:
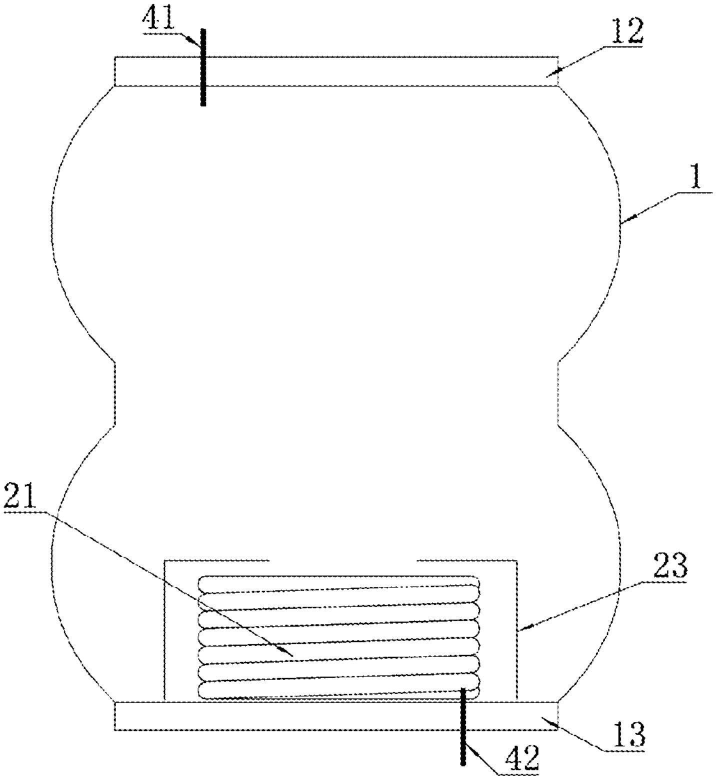
FIG. 16 is a diagram of the air spring in Embodiment 4.
Figure 17:
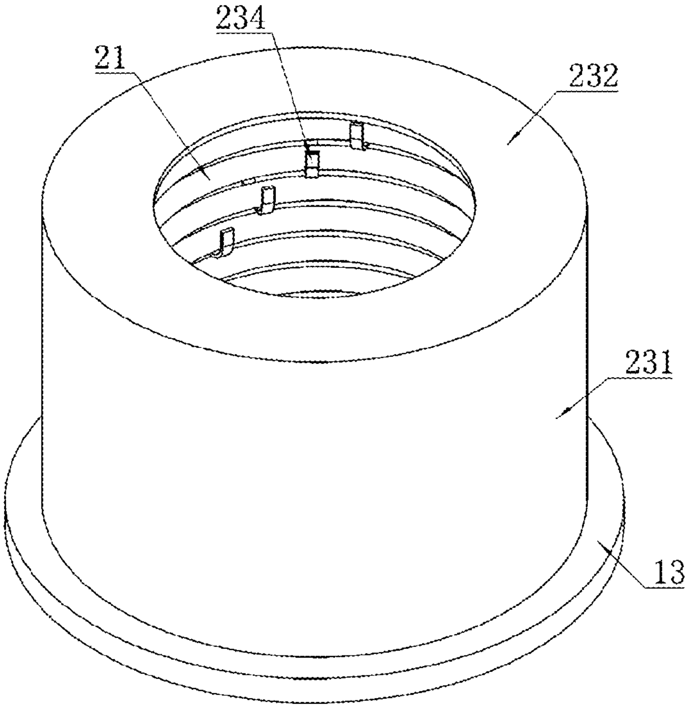
FIG. 17 is a schematic stereogram of the stiffness adjustment assembly in Embodiment 4.

As shown in FIG. 16 and FIG. 17, the stiffness adjustment assembly includes only one air spring bellow for adjustment 21. The air spring bellow for adjustment 21 is shaped as a spiral hose. The air spring bellow for adjustment 21 has a closed upper end and an open lower end. The lower sealing plate 13 is configured with a sixth connection tube 136, the sixth connection tube 136 is configured with a second gas opening 42. The lower end (open end) of the air spring bellow for adjustment 21 is tightly connected with the sixth connection tube 136.

The sixth connection tube 136 is configured with a second pressure measuring opening (not shown) below the lower sealing plate 13. The second pressure measuring opening is provided with a sensor (not shown) for detecting the gas pressure in the second region.

Figure 20:
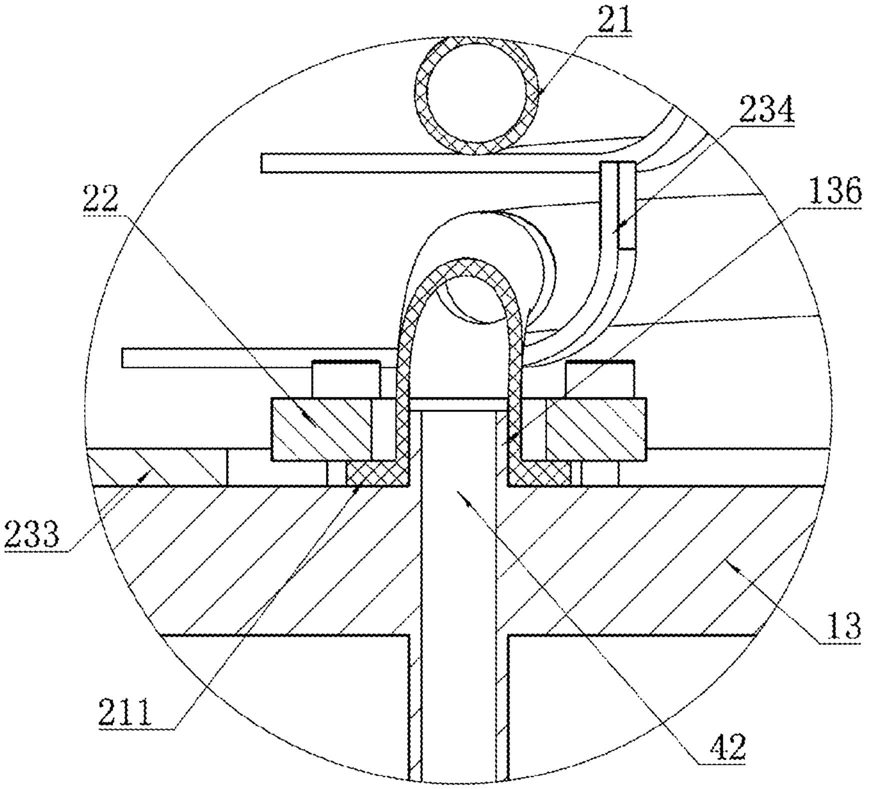
FIG. 20 is an enlarged structural diagram of portion D in FIG. 19.
Figure 21:
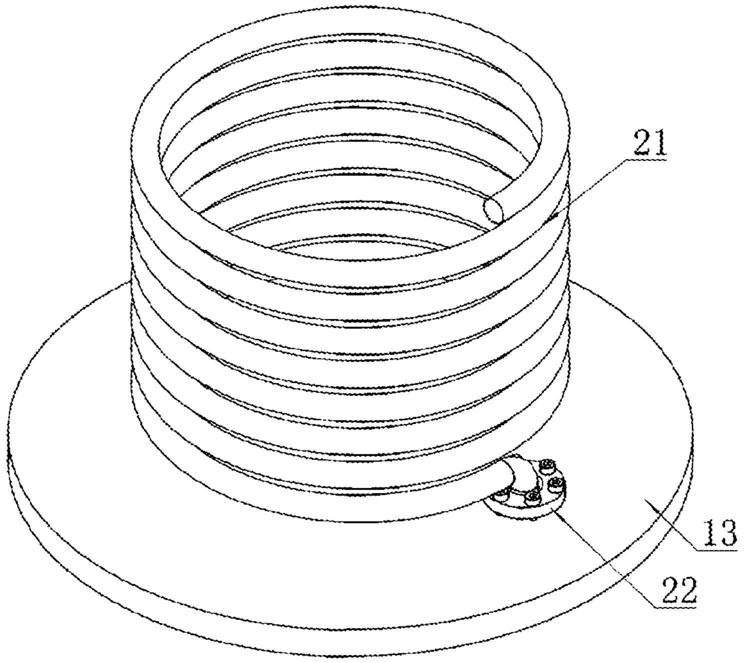
FIG. 21 is a diagram showing the mounting structure of the air spring bellow for adjustment in Embodiment 4.

As an embodiment shown in FIG. 20 and FIG. 21, the air spring bellow for adjustment 21 in this embodiment includes a spiral main hose body. The upper end of the main hose body is closed, while the lower end thereof is open. The lower end (open end) of the main hose body is configured with a connection hose body extending downwards in the vertical direction. The connection hose body is in communication with the main hose body. The sixth connection tube 136 is inserted in the connection hose body of the air spring bellow for adjustment 21. The opening at the lower end of the connection hose body is provided with a base seat 211. A pressuring plate 22 is wrapped around the connection hose body and is positioned above the base seat 211. The base seat 211 is pressed and fixed between the lower sealing plate 13 and the pressuring plate 22. The pressuring plate 22 is fixedly connected with the lower sealing plate 13 via a screw.

Figure 18:
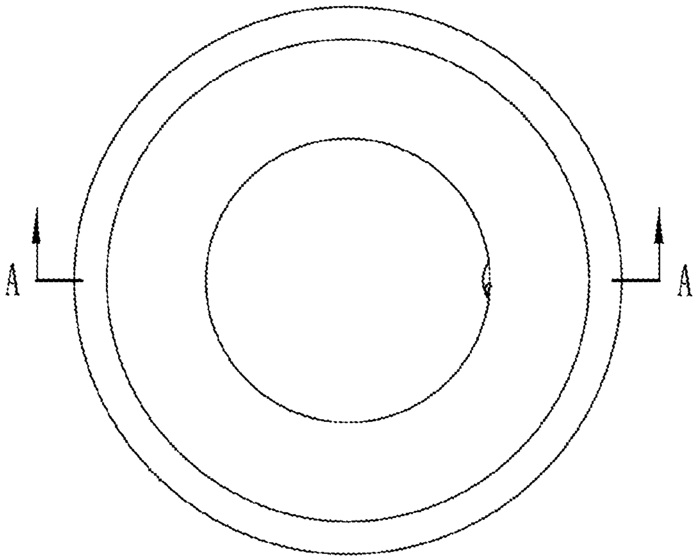
FIG. 18 is a top view of the stiffness adjustment assembly in Embodiment 4.
Figure 19:
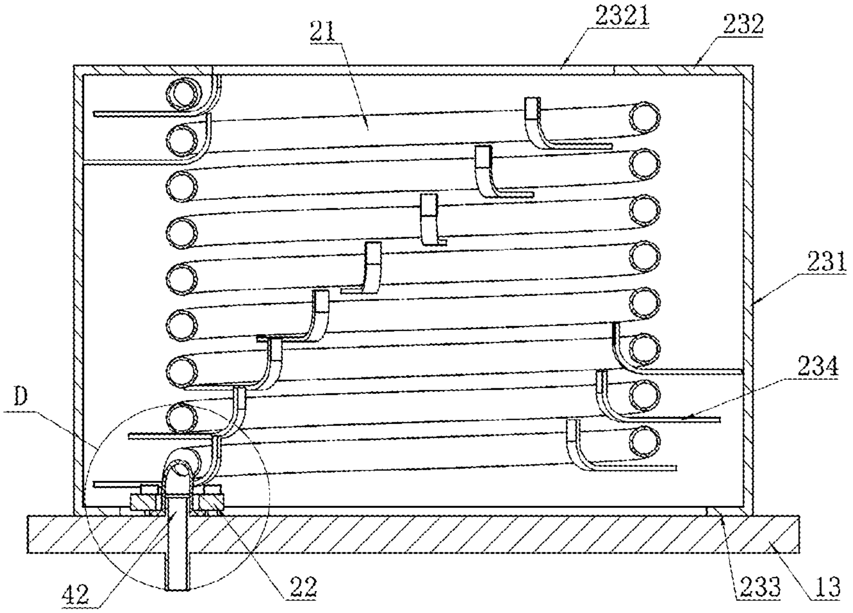
FIG. 19 is a section view along line A-A in FIG. 18.

Further, an anti-collision shield 23 is arranged outside the air spring bellow for adjustment 21, as shown in FIG. 18 and FIG. 19, in order to reliably retain the spiral structure of the air spring bellow for adjustment 21. The anti-collision shield 23 includes a sleeve body 231 shaped as a circular cylinder sleeve. The upper end of the sleeve body 231 is provided with a top protection plate 232 extending inwards in the radial direction. The top protection plate 232 is configured with a gas passage 2321. Herein, the top protection plate 232 can be configured with one or more gas passages 2321. The top protection plate 232 in this embodiment is configured with one gas passage 2321. The gas passage 2321 is coaxial with the top protection plate 232. The top protection plate 232 entirely is ring-shaped. The lower end of the sleeve body 231 is provided with a flanging 233 being folded inwards. The flanging 233 is fixedly connected to the lower sealing plate 13 via a screw. The inner wall of the sleeve body 231 of the anti-collision shield 23 is provided with a plurality of supporters 234 for supporting the spiral main hose body of the air spring bellow for adjustment 21. The plurality of supporters 234 are distributed in a same spiral form as the main hose body.

Further, as shown in FIG. 20, the supporter 234 includes a horizontal portion. The outer end of the horizontal portion is fixedly connected with the inner wall of the sleeve body 231. The inner end of the horizontal portion is configured with a stop bending upwards.

The remaining structures are the same as Embodiment 1.

Embodiment 5

Figure 22:
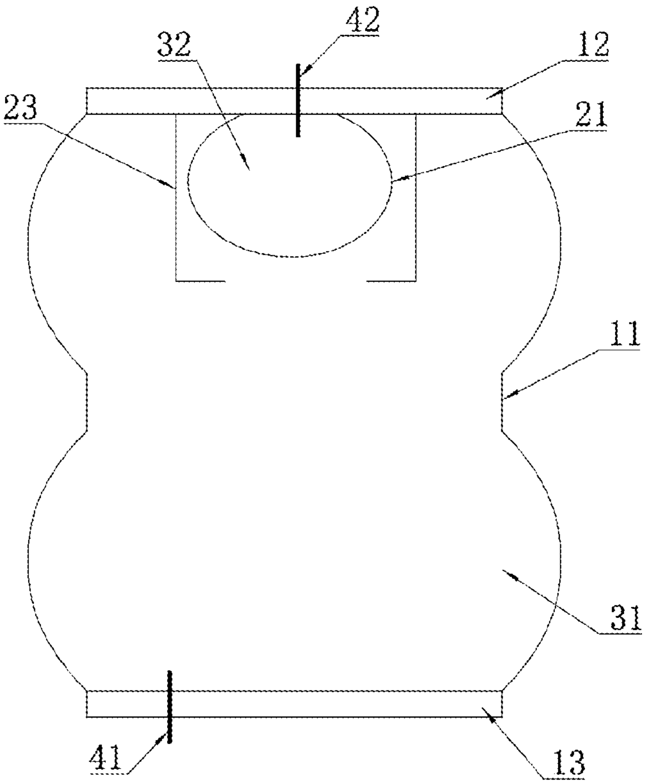
FIG. 22 is a diagram of the air spring in Embodiment 5.

As shown in FIG. 22, the stiffness adjustment assembly is arranged at the upper sealing plate 12 of the main body 1.

The stiffness adjustment assembly includes a plurality of air spring bellows for adjustment 21, and each of the air spring bellows for adjustment 21 is configured with an opening at upper end. The opening at upper end of the air spring bellow for adjustment 21 is tightly connected with the upper sealing plate 12 at the main body 1. The upper sealing plate 12 is hollow, and the inner chamber thereof is defined as a third gas collection chamber. The upper side of the upper sealing plate 12 is configured with a second gas opening 42 in communication with the third gas collection chamber. The lower side of the upper sealing plate 12 is configured with a plurality of third gas openings 43 in communication with the third gas collection chamber. The number of the third gas openings 43 is the same as the number of the air spring bellows for adjustment 21, and the position of each third gas opening 43 is corresponding to that of each air spring bellow for adjustment 21. Each of the air spring bellows for adjustment 21 is in communication with the third gas collection chamber via corresponding one of the third gas openings 43.

Preferably, the plurality of air spring bellows for adjustment 21 are uniformly distributed on the upper sealing plate 12. The upper side of the upper sealing plate 12 is configured with a seventh connection tube and a second pressure measuring opening (not shown). The second gas opening 42 is defined at the seventh connection tube. The second pressure measuring opening is provided with a sensor (not shown) for detecting the gas pressure in the second region. The lower side of the upper sealing plate 12 is configured with an eighth connection tube. The third gas opening 43 is defined at the eighth connection tube.

The lower sealing plate 13 is provided with a first pressure measuring opening (not shown). The first pressure measuring opening is provided with a sensor (not shown) for detecting the gas pressure in the first region.

As an embodiment, the upper sealing plate 12 in this embodiment includes a cover plate 131 and a base plate 132 from bottom to top successively. The upper edge of the main air spring bellow 11 is clamped and fixed between the cover plate 131 and the base plate 132. The cover plate 131 is fixedly connected with the base plate 132. The cover plate 131 and/or the base plate 132 are/is configured with a groove 1321 on the opposite faces thereof. The inner space of the groove 1321 serves as the third gas collection chamber. As an embodiment, the face of the base plate 132 opposite to the cover plate 131 is configured with the groove 1321 in this embodiment, that is, the lower side of the base plate 132 is configured with the groove 1321.

Further, the upper edge of the main air spring bellow 11 is configured with a first flange 111 extending in the groove 1321. The connection reliability and the tightness between the main air spring bellow 11 and the upper sealing plate 12 can be ensured by the first flange 111, so as to prevent the upper edge of the main air spring bellow 11 from removing out of the upper sealing plate 12.

As an embodiment, the opening at upper end of the air spring bellow for adjustment 21 in this embodiment is provided with a base seat 211 horizontally extending outward. A pressuring plate 22 is arranged below the upper sealing plate 12. The pressuring plate 22 is configured with reserved holes 221 respectively corresponding to the air spring bellows for adjustment 21. The lower portion of the air spring bellow for adjustment 21 passes through the corresponding reserved hole 221 and extends up to a position below the pressuring plate 22. The pressuring plate 22 is fixedly connected with the upper sealing plate 12. The base seat 211 of the air spring bellow for adjustment 21 is sealed and pressed between the pressuring plate 22 and the upper sealing plate 12.

The air spring bellow for adjustment 21 can be configured as a bladder or a hose. As an embodiment, the air spring bellow for adjustment 21 in this embodiment is configured as a circular cylindrical hose.

Further, the stiffness adjustment assembly further includes an anti-collision shield 23, in order to avoid damage of the air spring bellow for adjustment 21 caused by collision between the upper sealing plate 12 and the air spring bellow for adjustment 21 due to the excessive squeezing of the air spring at work. The air spring bellow for adjustment 21 is positioned in the anti-collision shield 23.

As an embodiment, the anti-collision shield 23 in this embodiment includes a sleeve body 231 in a shape of a circular cylindrical sleeve. The lower end of the sleeve body 231 is provided with a top protection plate 232 extending radially inwards. The top protection plate 232 is configured with a gas passage 2321. The top protection plate 232 herein is configured with one or more gas passages 2321. The top protection plate 232 in this embodiment is configured with one gas passage 2321, and the gas passage 2321 is coaxial with the top protection plate 232. The top protection plate 232 entirely is ring-shaped.

The upper end of the sleeve body 231 is configured with a flanging 233 being folded inwards. The flanging 233 is fixedly connected to the pressuring plate 22 through a screw.

The remaining structures are the same as Embodiment 1.

A vehicle air suspension system includes an air spring. The air spring is configured as the air spring according to one of the above Embodiment 1 to Embodiment 5, which won't be repeatedly described.

A vehicle includes the above vehicle air suspension system.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1 main body
11 main air spring bellow
111 first flange
12 upper sealing plate
13 lower sealing plate
131 cover plate
1311 second connection tube
132 base plate
1321 groove
1322 first connection tube
133 mounting hole
134 fifth connection tube
135 snapping groove
136 sixth connection tube
21 air spring bellow for adjustment
211 base seat
2111 second flange
22 pressuring plate
221 reserved hole
23 anti-collision shield
231 sleeve body
232 top protection plate
2321 gas passage

233 flanging
234 supporter
24 gas collection plate
241 second gas collection chamber
242 third connection tube
2421 sealing ring
2422 locking nut
243 fourth connection tube
31 first region
32 second region
41 first gas opening
42 second gas opening
43 third gas opening
5 high-pressure gas source

What is claimed is:

1. An air spring with adjustable stiffness, comprising a main body comprising an upper sealing plate, a lower sealing plate and a main air spring bellow, wherein an air spring bellow for adjustment is arranged in the main body, an inner space of the main body is divided by the air spring bellow for adjustment into a first region out of the air spring bellow for adjustment and a second region inside the air spring bellow for adjustment;

the first region and the second region are respectively connected to a gas source out of the main body, and a gas pressure in the first region and a gas pressure in the second region are configured to be individually controlled, an open end of the air spring bellow for adjustment is connected with the lower sealing plate, and the lower sealing plate is configured with a first gas opening in communication with the second region, and a plurality of air spring bellows for adjustment are provided, a first gas collection chamber is defined in the lower sealing plate, and the plurality of air spring bellows for adjustment are in communication with the first gas collection chamber.

2. The air spring with adjustable stiffness according to claim 1, wherein the open end of each of the plurality of air spring bellows for adjustment is provided with a base seat, a pressuring plate is arranged above the base seat, and the base seat is pressed and fixed between the pressuring plate and the lower sealing plate.

3. The air spring with adjustable stiffness according to claim 1, further comprising an anti-collision shield on the lower sealing plate, wherein the anti-collision shield comprises a sleeve body, an upper end of the sleeve body is provided with a top protection plate, the top protection plate is configured with a gas passage, and the air spring bellow for adjustment is positioned in the anti-collision shield.

4. The air spring with adjustable stiffness according to claim 1, further comprising a gas collection plate on the lower sealing plate, wherein a second gas collection chamber is defined in the gas collection plate, a lower side of the gas collection plate is configured with a connection tube, the connection tube is configured with the first gas opening in communication with the second gas collection chamber, the connection tube passes through the lower sealing plate and is connected with the lower sealing plate, each of the plurality of air spring bellows for adjustment is in communication with the second gas collection chamber via a respective second gas opening at the gas collection plate.

5. The air spring with adjustable stiffness according to claim 1, wherein the main air spring bellow and the air spring bellow for adjustment are respectively connected to an external gas source via a pressure adjustment system.

6. A vehicle air suspension system, wherein an air spring at the vehicle air suspension system is configured as the air spring with adjustable stiffness according to claim 1.

7. A vehicle comprising the vehicle air suspension system according to claim 6.

* * * * *